United States Patent [19]

Akachi et al.

[11] Patent Number: 5,105,580
[45] Date of Patent: Apr. 21, 1992

[54] WEATHER STRIP FOR MOTOR VEHICLE

[75] Inventors: Keiji Akachi, Gifu; Harumi Kogiso, Inazawa; Kazuo Ogawa; Nobuyuki Okada, both of Ota, all of Japan

[73] Assignees: Toyoda Godei Co., Ltd., Nishikasugai; Fuji Jukogyo Kabushiki Kaisha, Tokyo, both of Japan

[21] Appl. No.: 608,019

[22] Filed: Nov. 2, 1990

Related U.S. Application Data

[63] Continuation of Ser. No. 445,049, Dec. 4, 1989, abandoned.

[30] Foreign Application Priority Data

Dec. 13, 1988 [JP] Japan ................. 63-161638

[51] Int. Cl.5 .............................. E06B 7/16
[52] U.S. Cl. ........................... 49/476; 49/441
[58] Field of Search ............. 49/440, 441, 476, 479, 49/483, 485, 488, 498

[56] References Cited

U.S. PATENT DOCUMENTS

| | | | |
|---|---|---|---|
| 3,938,856 | 2/1976 | Janssen | 49/476 X |
| 4,616,446 | 10/1986 | Okamoto | 49/441 |
| 4,817,336 | 4/1989 | Kisanuki | 49/476 |
| 4,827,670 | 5/1989 | Kogiso et al. | 49/476 |
| 4,908,989 | 3/1990 | Omura et al. | 49/441 |
| 4,919,471 | 4/1990 | Seino et al. | 49/476 X |

FOREIGN PATENT DOCUMENTS 214411 12/1983 Japan .................. 49/476
60-189419 12/1985 Japan .
63-235143 9/1988 Japan .

Primary Examiner—Rodney M. Lindsey
Assistant Examiner—Jerry Redman
Attorney, Agent, or Firm—Cushman, Darby & Cushman

[57] ABSTRACT

A weather strip attached along a door opening of a motor vehicle for sealing between the door opening and a periphery of a door glass has a strip-shaped extruded portion, and a molded end portion jointed to a lower end of the extruded portion. The strip-shaped extruded portion has a longitudinally extending tubular main seal portion and a lip-shaped seal portion which defines a concave groove with the main seal portion. The molded end portion has an extended concave groove extending from the concave groove of the strip-shaped extruded portion to a rear side edge of the molded end portion. During running of a vehicle in rainy weather or during washing of the vehicle, water leaking into the concave groove flows along the extended concave groove and is drained out therefrom without staying at an end of the extended concave groove thereby preventing water from intruding into a vehicle compartment when a vehicle door is opened or closed.

5 Claims, 4 Drawing Sheets

WEATHER STRIP FOR MOTOR VEHICLE

This is a continuation of application Ser. No. 07/445,049, filed Dec. 4, 1989, which was abandoned upon the filing hereof.

BACKGROUND OF THE INVENTION

1. Field of the Present Invention

The present invention relates to a weather strip for a motor vehicle, and more particularly to a weather strip to be attached along a door opening of a vehicle body.

2. Description of the Prior Art

In a motor vehicle provided with a frameless door, such as a hard top car, weather strips are attached along roof sides of a front door opening and a rear door opening, respectively, for sealing peripheries of door glasses when doors are closed. FIG. 5 illustrates an end portion of the above-described type of weather strip which is attached along the center pillar. In the drawing, reference numeral 2 designates a front door, and reference numeral 1 designates a door glass.

Recently, in order to improve the sealing performance of the weather strip, there has been used a double-seal type weather strip 4 having two seal points S1 and S2 as shown in FIG. 5, which forms two parallel seal lines with a door glass 1. In this double-seal type weather strip 4, a concave groove 44 is formed between two seal lines. A lower end 441 of this concave groove 44 is located in the middle of the molded end portion 4B, and the depth and the width of the concave groove 44 is gradually decreased toward its lower end 441. This double-seal type weather strip makes water leaking through the outside seal line flow down along the concave groove 44 and prevents the water from intruding into a vehicle compartment by virtue of another inside seal line.

However, in the above-described conventional double-seal type weather strip 4, when the door 2 is closed and the upper end of the rear portion of the door 2 is pressed on the molded end portion 4B, the lower end 441 of the concave groove 44 becomes a dead end. This results in the water flowing down in the concave groove 44 accumulating in the lower end 441. When the door 2 is forcefully opened, one portion of the water which has accumulated in the lower end 441 will splash into the vehicle compartment.

Accordingly, in order to overcome the above-described defect of the conventional double-seal type weather strip, the weather strip has been improved. In the improved weather strip, a drainage hole is formed at the position corresponding to the lower end 441 so as to penetrate the molded end portion 4B. The drainage hole drains the water flowing down in the concave groove 44 from the reverse surface of the end portion 4B, but a die for molding the end portion 4B having the drainage hole is complex in construction thereby reducing the production efficiency.

SUMMARY OF THE INVENTION

It is an object of the present invention to provide a double-seal type weather strip having an end portion which enables the water leaking into a groove formed between double seal lines to be securely drained out from a vehicle, and is easily molded.

The double-seal type weather strip according to the present invention has a molded end portion of which a concave groove formed between two seal lines is provided with an extended concave groove extending to an edge of the molded end portion so as to open therein.

The water leaking into the concave groove formed between the seal lines flows along the extended concave groove and is drained out from the edge of the molded end portion thereby preventing water from intruding into the vehicle compartment. The above-described molded end portion is not provided with any through channel thereby facilitating the molding step.

BRIEF DESCRIPTION OF THE DRAWINGS

FIG. 1 is an overall front view of the weather strip;

FIG. 2 is a perspective view in partial cross-section of the portion C1 of FIG. 1;

FIG. 3 is an overall front view of the weather strip;

FIG. 4 is a perspective view in partial cross-section of the portion C2 of FIG. 3.

DETAILED DESCRIPTION OF THE EMBODIMENTS

Figure 1:
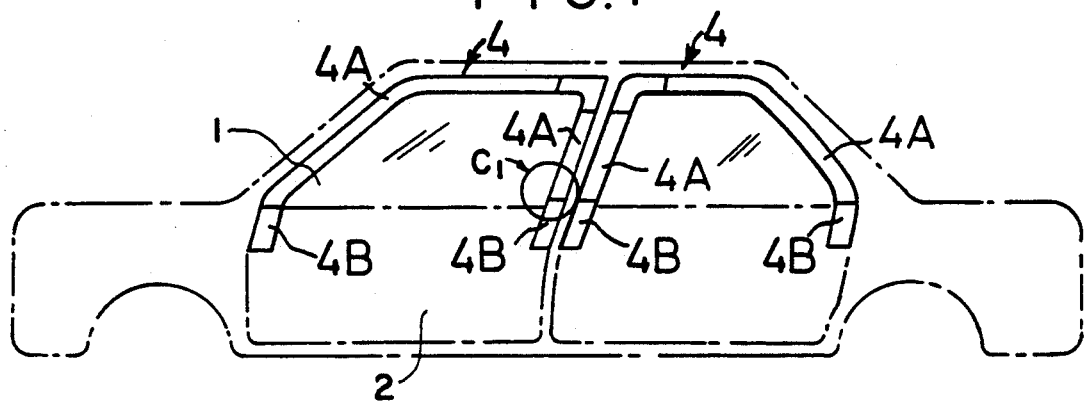
FIGS. 1 and 2 illustrate a first embodiment of a weather strip according to the present invention.
Figure 2:
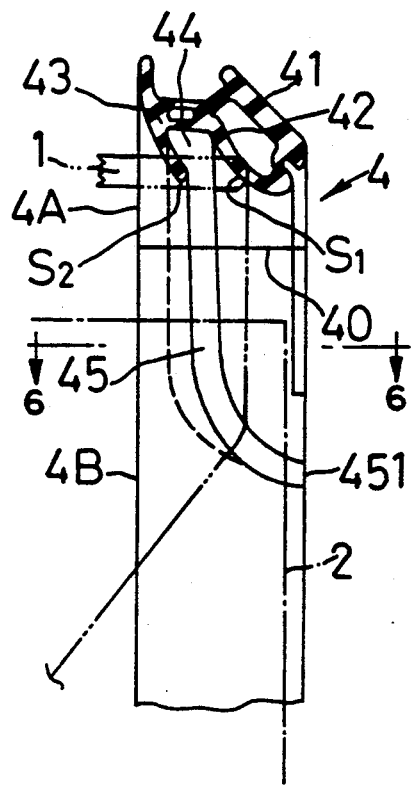

FIGS. 1 and 2 illustrate a first embodiment of a weather strip according to the present invention.

A weather strip 4 having such a construction as shown in FIG. 1 is attached along each of a front door opening and a rear door opening, and comes into pressure contact with a periphery of a door glass of a frameless door when being closed. Each weather strip 4 is composed of extruded portions 4A and molded end portions 4B which are jointed to the respective lower ends of the extruded portions 4A.

FIG. 2 illustrates a rear lower portion of a front side weather strip 4. The weather strip 4 is provided with a tubular main seal portion 42 and a lip-shaped seal portion 43 which come into contact with the periphery of a front door glass 1, respectively, at seal points S1 and S2, thereby forming parallel double seal lines and a concave groove 44 therebetween.

In FIG. 2, the molded end portion 4B is provided with an extended concave groove 45 extending from the concave groove 44 to a rear side edge of the end portion 4B. The extended concave groove 45 has a width and a depth substantially equal to those of the concave groove 44, and an end 451 thereof opens in the rear side edge of the end portion 4B. In FIG. 2, reference numeral 2 designates a front door, 40 designates a joint line of the extruded portion 4A and the molded end portion 4B. A base portion 41 of the extruded portion 4A is attached to a retainer (not shown) provided in a center pillar while the molded end portion 4B is secured to the center pillar by clips or the like.

Each of the other molded end portions has substantially the same construction as that of the above-described molded end portion 4B.

In the weather strip 4 having the above-described construction, water leaking into the concave groove 44 through one seal line of the main seal portion 42 during running of a vehicle in rainy weather or during washing of the vehicle, flows down along the concave groove 44 and the extended concave groove 45, and is drained out from the end 451 of the extended concave groove 45, thereafter flowing down along the center pillar. This results in that water does not stay at the end 451 of the extended concave groove 45, accordingly is prevented from intruding into a vehicle compartment when a vehicle door is opened or closed.

Figure 3:
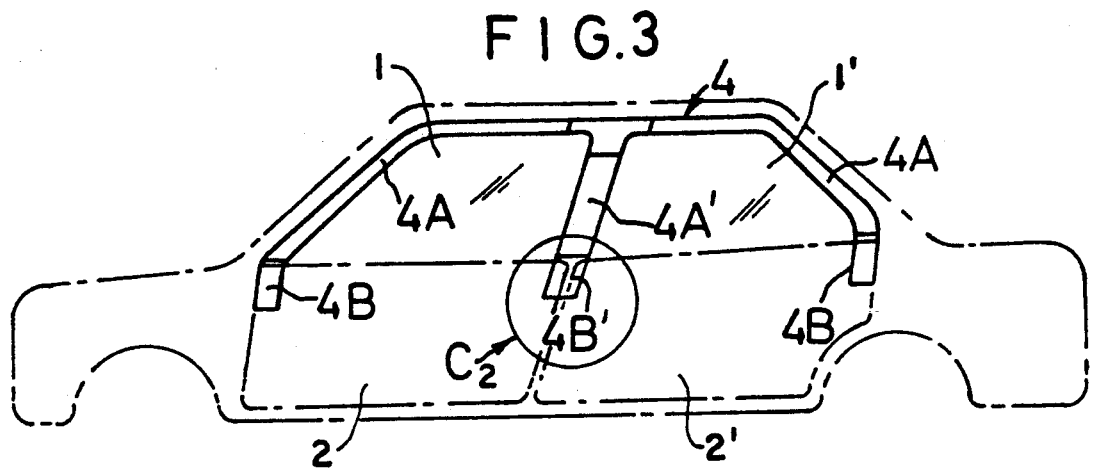
FIGS. 3 and 4 illustrate a second embodiment of a weather strip according to the present invention.
Figure 4:
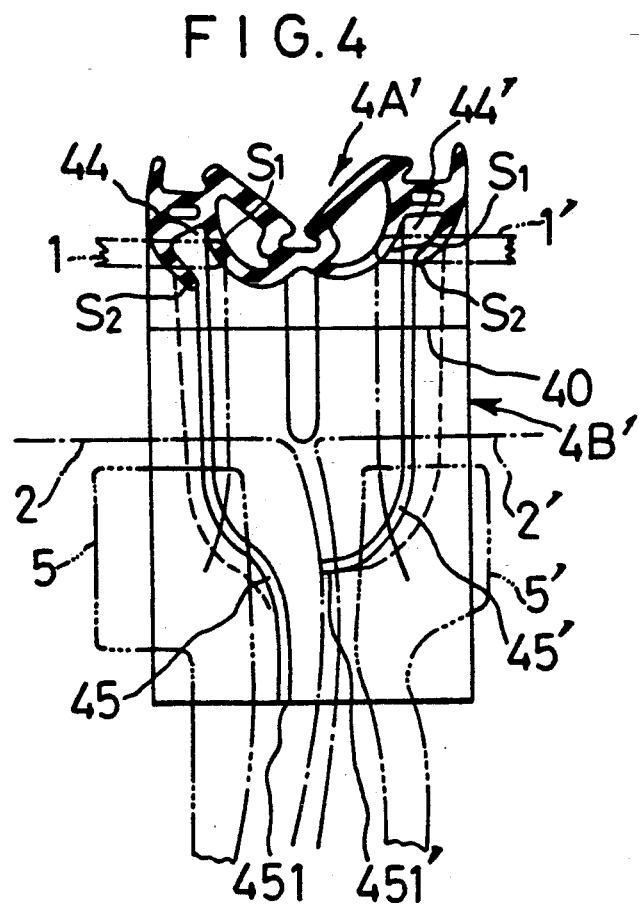
Figure 5:
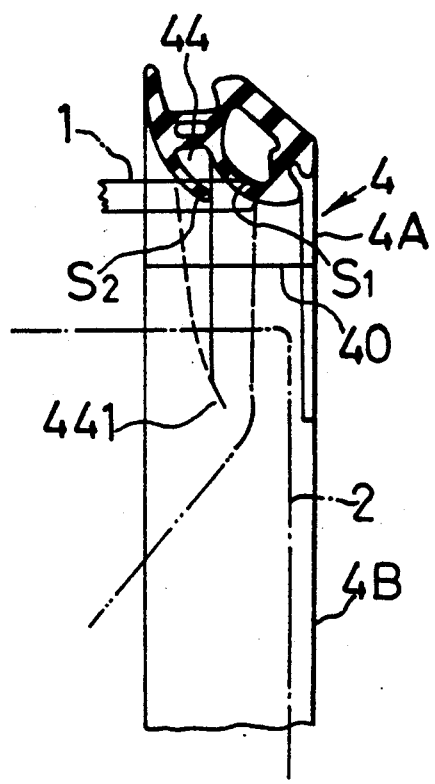
FIG. 5 is a perspective view in partial cross-section.
Figure 6:
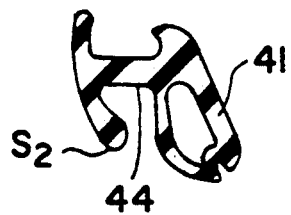
Figure 7:
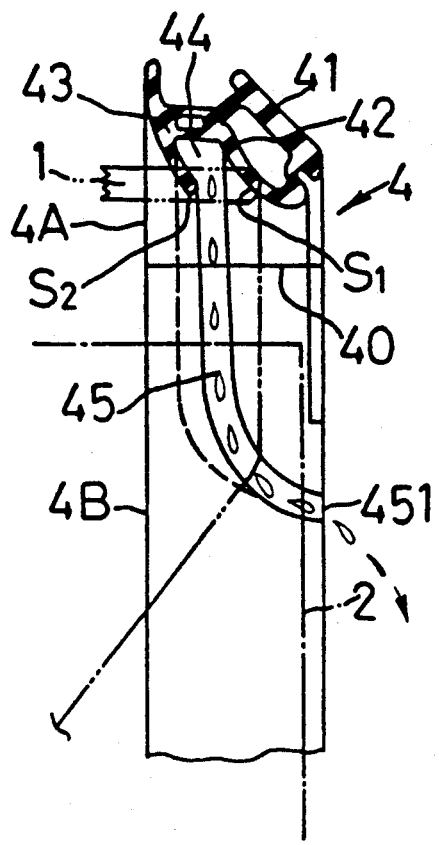
Figure 8:
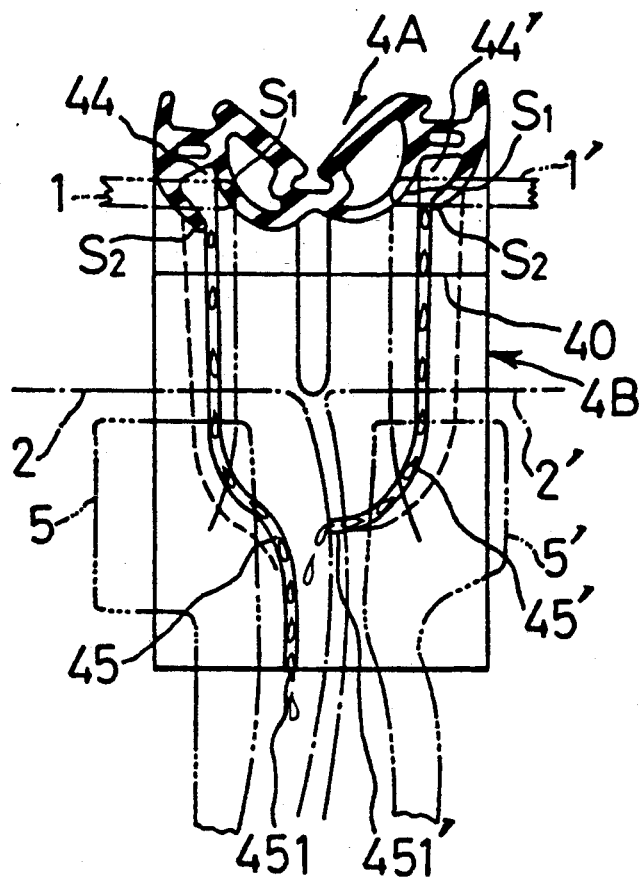

FIGS. 3 and 4 illustrate a second embodiment of a weather strip according to the present invention.

In the second embodiment, a weather strip 4 has an integral structure wherein a front side strip and a rear side strip is integral with each other along a center pillar.

FIG. 4 is a perspective view partially in cross section of a lower portion of the weather strip 4, encircled by the circle C, in FIG. 3. A molded end portion 4B' is jointed to a lower end of an extruded portion 4A'. The extruded portion 4A' has a V-shaped cross section peaking at a widthwise central portion thereof, and is attached to a retainer of a similarly V-shaped cross-section, which is provided in the center pillar.

The extruded portion 4A' has two seal points S1, S2 in each of its front and rear side sections, thereby providing a double seal structure, respectively. And grooves 44, 44' are formed between two seal lines of the respective front side section and rear side section.

The molded end portion 4B' jointed to the extruded portion 4A' is provided with extended concave grooves 45, 45' extending from the respective concave grooves 44, 44'. An end 451 of the extended concave groove 45 opens in a lower edge of the end portion 4B while an end 451' of the extended concave groove 45' opens in the peak portion of the end portion 4B', which is positioned between a rear edge of the front door 2 and a front edge of the rear door 2' when being closed. In FIG. 4, reference numerals 5, 5' designate end portions of door weather strips provided in the respective front door 2 and rear door 2'. These end portions 5, 5' come into pressure contact with a front side section and a rear side section of the end portion 4B' when the doors 2, 2' are closed.

In the weather strip of the second embodiment, water leaking into the groves 44, 44' through the seal lines formed by the seal points S1, flows down along the extended concave grooves 45, 45', thereafter being drained out from their ends 451, 451' and flowing down along the center pillar.

As described above, in the weather strip of the present invention, water leaking into the concave groove formed between the double seal lines is immediately drained out from the vehicle to prevent water staying in the groove from intruding into the vehicle compartment when a door is opened or closed. Moreover, the molded end portion provided with the extended concave groove adapted for draining water is simple in construction and is formed easily.

What is claimed is:

1. A weather strip attached along a door opening of a body of a motor vehicle for sealing between the door opening and a periphery of a door glass of a frameless door, comprising:
    a strip-shaped extruded portion;
    a molded end portion jointed to a lower end of said extruded portion;
    said strip-shaped extruded portion having two parallel seal lines along an outer surface thereof with respect to an interior of the motor vehicle, each said seal line extending in a longitudinal direction of said strip-shaped extruded portion so as to come into contact with an inner surface of the periphery of the door glass with respect to the interior of the motor vehicle when the window is up and the frameless door is closed and so as to be free from contact with the door glass when the window is up and the frameless door is fully opened; a concave groove being formed between said two parallel seal lines; said molded end portion having an extended concave groove along an outer surface thereof with respect to the interior of the motor vehicle, said extended concave groove extending from said concave groove of said strip-shaped extruded portion to an edge of said molded end portion.

2. A weather strip according to claim 1, wherein said strip-shaped extruded portion has a tubular main seal portion and a lip-shaped seal portion extending substantially parallel with said tubular main seal portion, said tubular main seal portion and said lip-shaped seal portion have one seal line, respectively, said concave groove is formed between said tubular main seal portion and said lip-shaped seal portion, and said extended concave groove has a width and a depth substantially equal to those of said concave groove.

3. A weather strip according to claim 2, wherein said extended concave groove extends until reaching a lower edge of said molded end portion, and opens in said lower edge.

4. A weather strip according to claim 2, wherein said extended concave groove extends until reaching a side edge of said molded end portion and opens in said side edge.

5. A weather strip attached along a door opening of a body of a motor vehicle for sealing between the door opening and a periphery of a door glass of a frameless door, comprising:
    a strip-shaped extruded portion;
    a molded end portion jointed to a lower end of said extruded portion, an outer surface of said molded end portion coming into contact with an upper end portion of a door weather strip attached along a periphery of the frameless door;
    said strip-shaped extruded portion having two parallel seal lines along an outer surface thereof with respect to an interior of the motor vehicle, each said seal line extending in a longitudinal direction of said strip-shaped extruded portion so as to come into contact with an inner surface of the periphery of the door glass with respect to the interior of the motor vehicle when the window is up and the frameless door is closed and so as to be free from contact with the door glass when the window is up and the frameless door is fully opened; a concave groove being formed between said two parallel seal lines; said molded end portion having an extended concave groove along an outer surface thereof with respect to the interior of the motor vehicle, said extended concave groove extending from said concave groove of said strip-shaped extruded portion to an edge of said molded end portion, which is located outside said upper end portion of said door weather strip.

* * * * *